United States Patent [19]

Stewart

[11] 4,333,174

[45] Jun. 1, 1982

[54] TRANSDUCER DISPLACEMENT APPARATUS FOR VIDEO DISC PLAYER

[75] Inventor: Myron C. Stewart, Indianapolis, Ind.

[73] Assignee: RCA Corporation, New York, N.Y.

[21] Appl. No.: 164,340

[22] Filed: Jun. 30, 1980

[51] Int. Cl.³ .............................................. G11B 3/02
[52] U.S. Cl. .................................... 369/256; 369/77; 369/219; 369/244
[58] Field of Search ................ 369/77, 215, 219, 220, 369/221, 244, 249, 255, 256, 271

[56] References Cited

U.S. PATENT DOCUMENTS 4,049,280  9/1977  Leedom .............................. 369/249

Primary Examiner—Steven L. Stephan
Attorney, Agent, or Firm—E. M. Whitacre; J. S. Tripoli; D. A. Kulkarni

[57] ABSTRACT

In a video disc player, a mechanism, responsive to opening of the carriage lid, retracts a carriage-mounted transducer to accommodate a pickup cartridge in a compartment provided in a pickup arm carriage. When the lid is closed, the subject mechanism advances the transducer to effect a secure engagement between the transducer and the cartridge.

3 Claims, 9 Drawing Figures

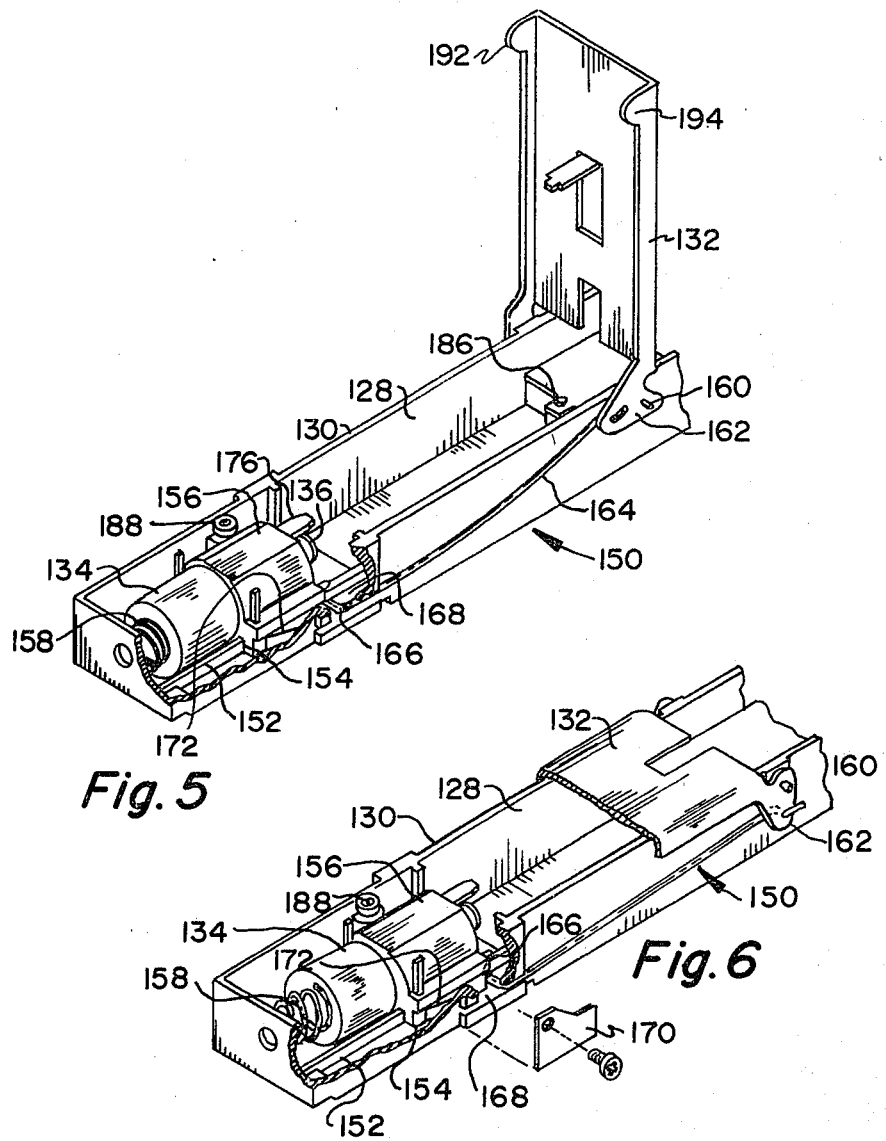
Fig. 5
Fig. 6
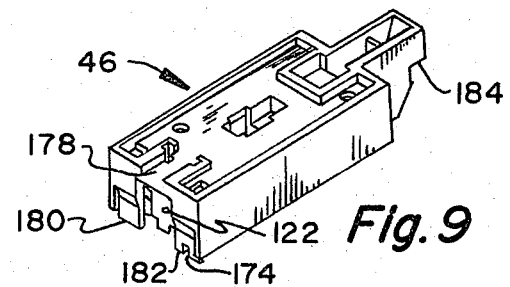
Fig. 9

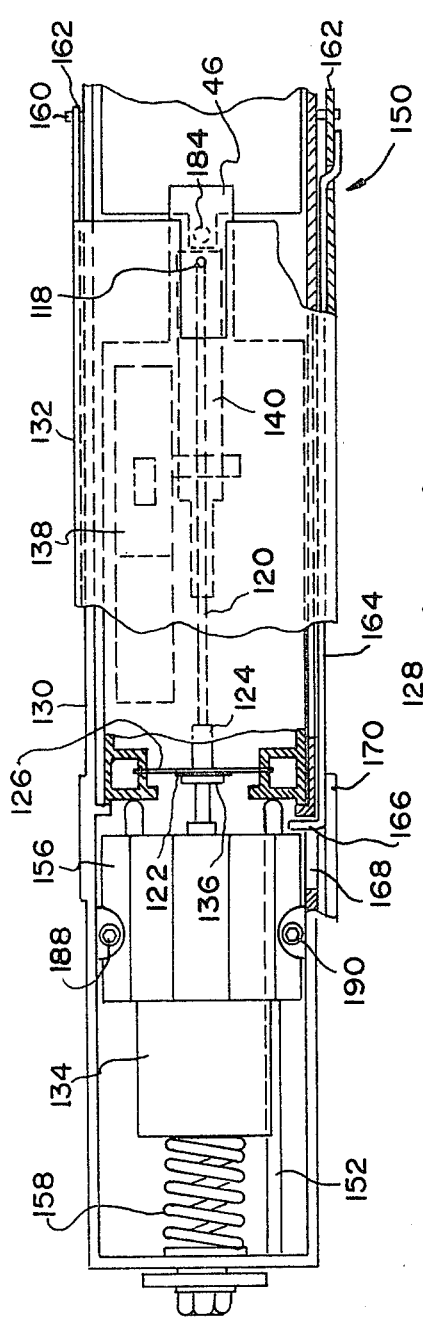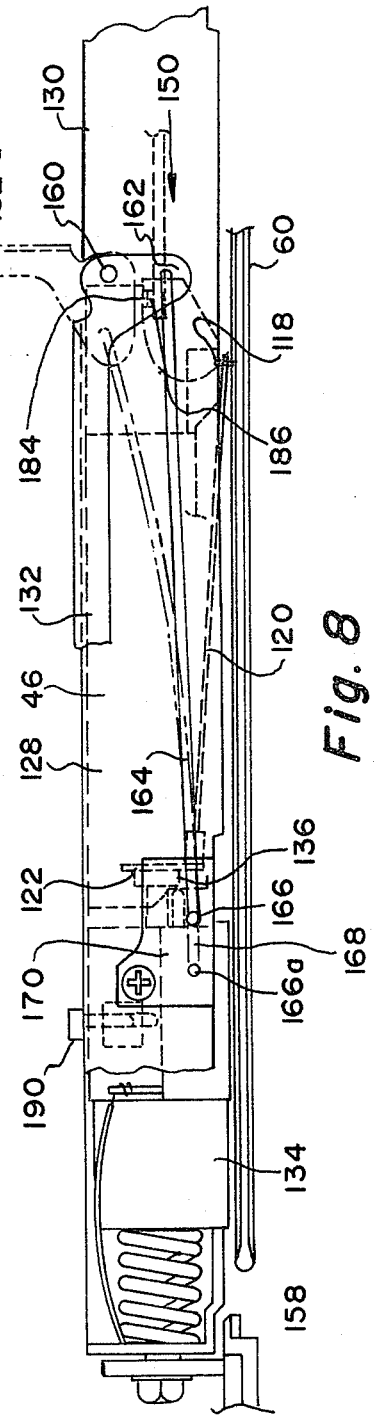

TRANSDUCER DISPLACEMENT APPARATUS FOR VIDEO DISC PLAYER

This invention relates to a disc record player, and more particularly, to a video disc type record player.

In certain systems, video information is stored on a disc record in the form of geometric variations in a continuous spiral track disposed on the record surface. The variations in capacitance between an electrode carried by a record-engaging stylus and a conductive property of a turntable-supported record are sensed as the stylus/record relative velocity is established to reproduce signals representative of the stored information. The reproduced signals are processed and applied to a television receiver. A capacitance-type pickup system is illustratively disclosed in U.S. Pat. No. 3,842,194 (Clemens).

In such systems, it is desirable to maintain the stylus/record relative velocity relatively constant, for example, to prevent annoying jitter of the displayed television picture, to prevent noticeable degradation of the picture quality, etc. Velocity errors result from several sources, such as: recording errors, pressing distortions, turntable mounting eccentricities, turntable speed errors, etc., to name a few. While close mechanical tolerances on components will reduce the velocity errors, it is advantageous to relax these tolerances, and, instead, compensate the velocity errors electrically.

To compensate the velocity errors, the pickup stylus is translated to-and-fro along the information track in a manner opposing cyclical deviations in the stylus/record relative velocity. A transducer (also known as "armstretcher") for translating the signal pickup back-and-forth in this fashion is described in U.S. Pat. No. 3,983,318 (Miller et al).

Typically, the pickup stylus is disposed at one end of a light-weight stylus arm, and the other end of the stylus arm is secured by a compliant coupler to a latch plate. The latch plate, in turn, is suspended in a replaceable protective cartridge, which is removably received in a carriage. The cartridge is placed in the compartment provided in the carriage, and a connection is established between the stylus arm latch plate and a latch cup disposed on the armstretcher transducer. It is important that the transducer is securely seated against the cartridge to assure a rigid connection between the latch cup and the latch plate. A stylus arm lifting/lowering mechanism selectively lowers the pickup stylus through an opening in the bottom wall of the carriage housing. During playback, the carriage is translated to follow the radial motion of the pickup stylus. In the systems of the type mentioned above, it is desirable to provide a mechanism for readily establishing a coupling between the latch cup disposed on the transducer and the latch plate carrying the stylus arm. U.S. Pat. No. 4,049,280 (Leedom) describes a coupling establishing mechanism.

As previously indicated, it is advantageous to relax tolerances without compromising performance. An apparatus, in accordance with this invention, offers these advantages. The subject apparatus includes a means for biasing the transducer away from a withdrawn position thereof. An actuated member, in response to the opening of the carriage lid, effects retraction of the transducer against the force of the biasing means to permit reception of the cartridge in the compartment provided in the carriage. The actuated member, responsive to the closing of the lid, allows displacement of the transducer away from the withdrawn position thereof under the influence of the biasing means until the transducer is securely seated against the cartridge to effect the latch plate/latch cup connection. Further closing of the lid causes additional displacement of the actuated member to a location where the transducer is free from engagement with the actuated member.

Figure 1:
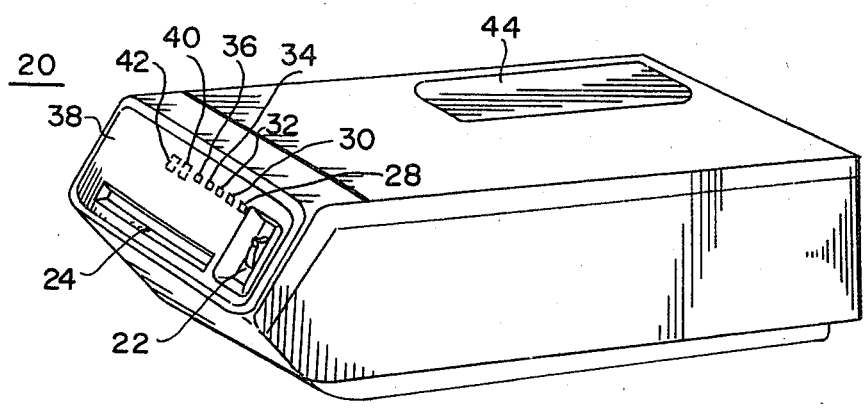
FIG. 1 shows a video disc player incorporating the transducer displacement apparatus according to the instant invention.
Figure 3:
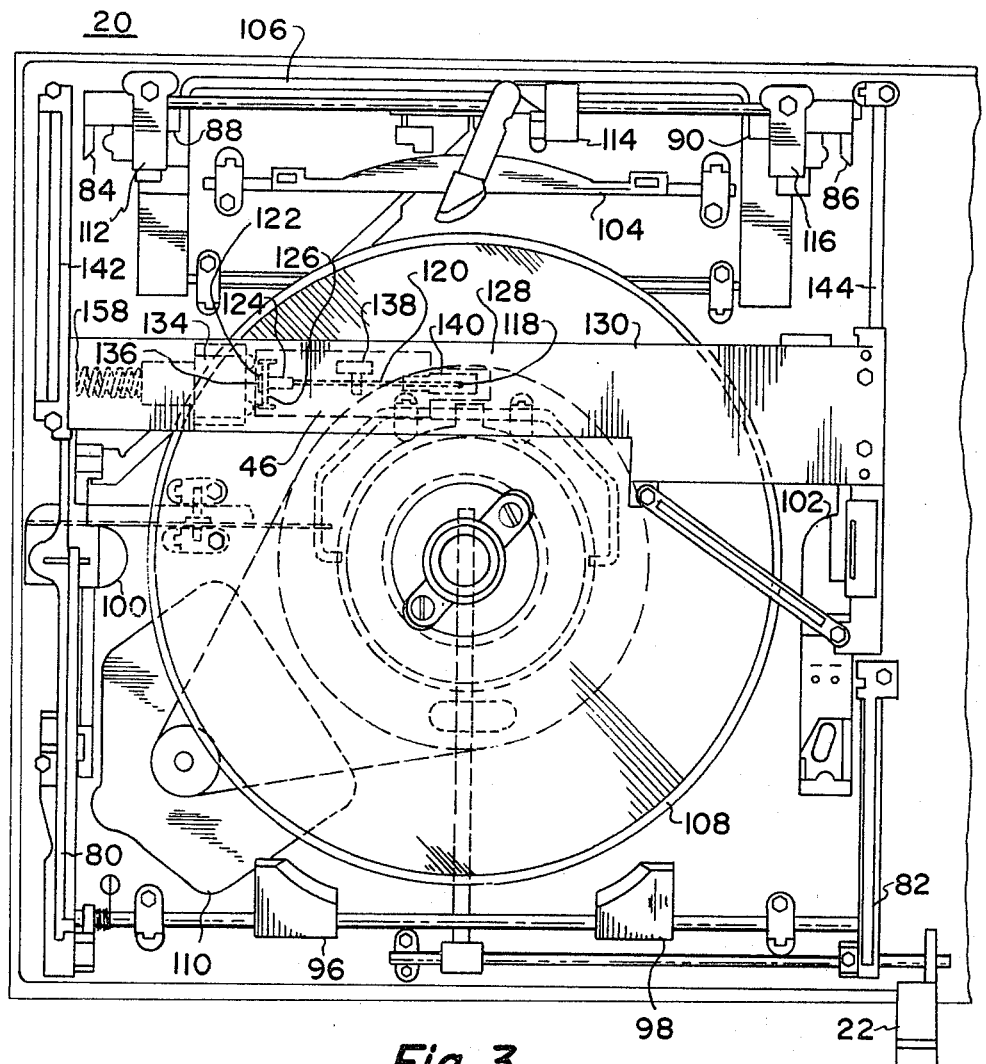
Figure 4:
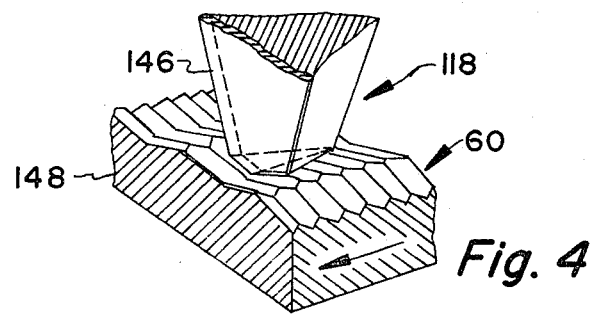

FIG. 3 provides a plan view of the player of FIG. 1;

FIG. 4 illustrates the capacitance pickup concept employed in the player of FIG. 1;

FIGS. 5 and 6 give perspective views of the subject transducer displacement apparatus, with the transducer shown, respectively, in a retracted position and an advanced position;

FIGS. 7 and 8 are, respectively, the plan view and the end view of the transducer displacement apparatus of FIGS. 5 and 6; and FIG. 9 is a perspective view of a pickup cartridge suitable for use in the practice of the subject invention.

Shown in FIG. 1 is a video disc player 20 having the subject transducer displacement apparatus. A function lever 22 is subject to disposition in any one of three poitions—OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a caddy 26, shown in FIG. 2, into the player to load an enclosed record therein. A pushbutton 28 is provided to dispose the player in the "PAUSE" mode. A set of pushbuttons 30, 32, 34 and 36 are arranged on the instrument panel 38 to dispose the player in any one of four "SEARCH" modes, i.e., rapid access (forward/reverse) and visual search (forward/reverse). A digital readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A door 44 is disposed on the cover of the player to provide access to a stylus cartridge 46 shown in more detail in FIG. 8.

Figure 2:
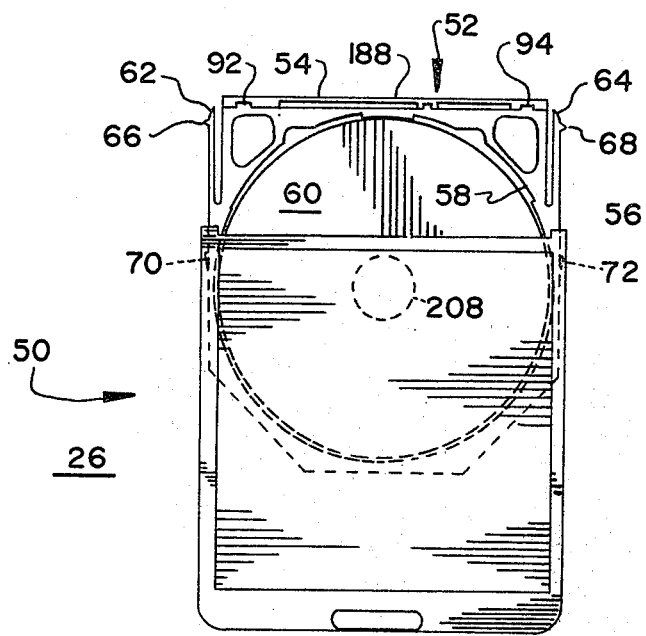
FIG. 2 illustrates a video disc caddy suitable for use with the player of FIG. 1.

As shown in FIG. 2, the video disc caddy 26 comprises a jacket 50 having an edge opening and a substantially planar, record retaining spine 52. The spine 52 has a portion 54 which serves as a closure and a further portion 56 having a circular opening 58 for receiving a record 60. The spine 52 is further provided with integrally-molded, flexural latch fingers 62 and 64. Each of the spine latch fingers 62 and 64 has a protruding element 66 and 68. The protruding elements 66 and 68 are received in pockets 70 and 72 disposed in the jacket 50 for releasably locking the spine 52 in place.

The operation of the caddy extraction mechanism will be first explained in conjunction with FIG. 3. To load a record, a caddy is inserted into the input slot 24 in the player along a path defined by guideways 80 and 82. As the caddy arrives at a fully inserted position, latch defeat members 84 and 86 enter the jacket 50 to defeat the spine latch fingers 62 and 64 for freeing the spine 52 from the jacket. Pivotally mounted in the player are spine gripper members 88 and 90 which are received in respective cutouts 92 and 94, arranged in the spine 52, when the caddy arrives at the fully inserted position to lock the spine to the player. Since the spine 52 is released from the jacket 50 through the operation of the latch defeat members 84 and 86 and is latched to the player through the operation of the spine gripper members 88 and 90, subsequent withdrawal of the jacket leaves the record/spine assembly in the player. The spring-loaded receiver pads 96, 98, 100, 102 and 104 serve to accurately locate the retained spine/record assembly in the player. A pair of springs (not shown) disposed between a gripper arm 106, which carries the spine gripper members 88 and 90, and the latch defeat members 84 and 86 effect downward deflection of the latch defeat members during jacket withdrawal.

To transfer the retained record to a turntable 108, the function lever 22 is moved to the PLAY position, which, in turn, raises the turntable and starts a turntable motor 110. A set of hold-down members 112, 114 and 116 hold the retained spine 52 in place against the receiver pads 96-104 while permitting the retained record to be intercepted by the turntable 108 when it is raised. The hold-down members 112, 114 and 116 also serve to accurately locate the retained spine 52, longitudinally and laterally, in the player.

A pickup stylus 118 is disposed at one end of a stylus arm 120, the other end of which is secured to a latch plate 122 by means of a rubber coupler 124. The latch plate 122 is suspended in the cartridge 46 by means of a rubber diaphragm 126. The cartridge 46 is placed in a compartment 128 provided in a stylus arm carriage 130, and the carriage lid 132, shown in FIGS. 5-8, is closed. Disposed in the carriage 130 is a slidably-mounted arm-stretcher transducer 134 (e.g., of the type described in U.S. Pat. No. 3,983,318) which is provided with a latch cup 136 subject to engagement with the latch plate 124. The transducer 134 is advanced in response to the closure of the cartridge lid 132, in the manner described in more detail later, until the transducer is firmly pressed against the cartridge 46 to effect a secure connection between the latch plate 122 and the latch cup 136.

A stylus arm lifting/lowering mechanism 138 (for example, of the general variety shown in U.S. Pat. No. 4,053,161) mounted in the carriage 130 selectively lowers the pickup stylus 118 through an opening 140 provided in the bottom wall of the carriage to effect record engagement. During playback, the carriage 130 is translated on guiderails 142 and 144 disposed parallel to the caddy guideways 80 and 82 from a starting position at the back of the player toward the front of the player in synchronism with the radially inward motion of the pickup stylus 118. In the manner indicated in FIG. 4, the variations in capacitance between an electrode 146 carried by the stylus 118 and a conductive property 148 of the record 60 are sensed to reproduce the stored information on the record. The recovered signals are processed to reconstruct a standard television signal containing picture and sound information for application to a television receiver.

To transfer the record back to the receiver pads 96-104 after playback, the function lever 22 is shifted back to the LOAD/UNLOAD position, which, in turn, lowers the turntable 108 to a level below the receiver pads. When the turntable 108 is lowered, the record is deposited on the receiver pads 96-104 for reception in the opening 58 disposed in the spine 52. The turntable motor 110 is shut off when the function lever 22 is displaced to the LOAD/UNLOAD position. To retrieve the record/spine assembly, the empty jacket 50 is inserted into the player through the input slot 24 along the guideways 80 and 82. As the jacket 50 arrives at the fully inserted position, the front edge thereof engages the already deflected latch defeat members 84 and 86 to cause further downward deflection thereof. Such further downward deflection of the latch defeat members 84 and 86, in turn, effects downward displacement of the spine gripper members 88 and 90, whereby the spine 52 is freed from the player. When the jacket 50 is fully inserted into the player, the protruding elements 66 and 68 of the spine latch fingers 62 and 64 snap back into the pockets 70 and 72 to lock the spine 52 to the jacket. The record/spine assembly is withdrawn from the player when the caddy is extracted.

The subject transducer displacement apparatus 150 for effecting a secure connection between the arm-stretcher transducer 134 and the cartridge 46 will now be described in conjunction with FIGS. 5-8. The carriage 130 is provided with an elongated locating rail 152 which is received in a groove 154 disposed in the transducer housing 156 for guiding the to-and-fro motion of the transducer 134. A biasing spring 158 is disposed between the carriage 130 and the transducer 134 for biasing the transducer away from a retracted position thereof. To install a cartridge into the player, the carriage lid 132 is opened to retract the transducer 134 to permit the reception of the cartridge 46 into the compartment 128, the cartridge is placed in the compartment, and the lid is closed to allow the spring 158 to advance the transducer to effect a firm engagement between the transducer and the cartridge.

The carriage lid 132 is pivoted about an axis 160 disposed on the side of the cartridge compartment 128 away from the transducer side thereof. Integrally disposed on the carriage lid 132 in the vicinity of the pivoted end thereof, and at right angles to it, is an actuating member comprising a lever arm 162. A connecting link 164 has its one end pivotally secured to the lever arm 162. The other end of the connecting link 164 has an offset portion 166 which is slidably mounted in a slot 168 disposed in the carriage 130 such that the offset portion holds the transducer 134 against the biasing spring 158. A hold-down bracket 170 is secured to the carriage 130 near the offset portion 166 of the connecting link 164 to secure the offset portion. The link 164 and the portion 166 comprise the actuated member.

As shown in FIG. 5, when the lid 132 is fully opened, the lever arm 162 is located such that the opposing force of the biasing spring 158, transmitted through the link 164, tends to support and keep the lid open. On the other hand, as shown in FIG. 6, when the lid 132 is closed, the location of the lever arm 162 is changed as it rotates about the axis 160 to a lower position. The final location of the lever arm 162, when the lid 132 is fully closed, is such that the offset portion 166 does not interfere with the transducer mechanism 134.

A leaf spring 172 is provided to urge the transducer 134 against the locating rail 152 to assure the side-to-side alignment of the transducer and to take up any excessive play between the locating rail and the groove 154. The locating rail 152 extends forward for engagement with a notch 174 provided in the cartridge 46, shown in FIG. 9, to assure the lateral registration of the cartridge. Disposed on the transducer housing 156 is a cantilevered projection 176 which is received in a recess 178 molded in the cartridge 46 to hold the cartridge down in the carriage compartment 128. The cartridge 46 is additionally provided with abutments 180 and 182 to assure the desired vertical location of the cartridge with respect to the carriage 130. A terminal 184, shown in FIG. 9, disposed on the cartridge 46, and subject to engagement with a terminal 186, illustrated in FIG. 5, arranged in the carriage 130, serves as third reference point for assuring the vertical alignment of the cartridge in respect of the carriage. The transducer 134 is held in the carriage 130 by two self-locking screws 188 and 190. The cartridge lid 132 is provided with a pair of ears 192 and 194 which nest the sides of the carriage 130 as the lid is closed to assure proper alignment of the lid with respect to the carriage.

The operation of the subject transducer displacement apparatus 150 will now be briefly described. To load the cartridge 46, the carriage lid 132 is raised. As the lid 132 is raised, the offset portion 166 of the connecting link 164 pushes the transducer 134 toward the retracted position thereof, shown in FIG. 5, against the force of the biasing spring 158 to make room for the cartridge 46. The cartridge 46 is placed in the carriage compartment 128, and the lid 132 is closed, in the manner indicated in FIG. 6. As the lid 132 is closed, the offset portion 166 of the connecting link 164 allows the transducer 134 to advance under the influence of the biasing spring 158 until the transducer is properly seated against the cartridge 130 to, in turn, ensure a secure coupling between the latch plate 122 of the stylus assembly and the latch cup 136. Further closing of the lid 132, effects additional advancement of the offset portion 166 of the connecting link 164 to free the transducer 134 from any interference by the offset portion.

The subject transducer displacement apparatus allows relaxation of the mechanical tolerances of the components, and yet provides a controlled, repeatable engagement between the transducer and the cartridge.

What is claimed is:

1. In a system for recovering prerecorded information from an information track disposed on a disc record by means of a pickup stylus when stylus/record relative velocity is established; said pickup stylus being disposed at one end of a stylus arm assembly; the other end of said stylus arm assembly being suspended in a protective cartridge; said system including a translatably-mounted carriage having a compartment for removably receiving said pickup cartridge; said system further having a transducer slidably-mounted in said carriage for motion toward and away from a retracted position thereof; said transducer having a support element subject to coupling with the other end of said stylus assembly; said cartridge compartment having a movably-mounted cover; apparatus comprising:

(A) means for generating a force for biasing said transducer away from said retracted position thereof; and (B) a transducer retraction means including an actuated member; said actuated member engaging said transducer in response to the opening of said cartridge cover for retracting said transducer against the force of said biasing means to provide room for receiving said cartridge in said compartment; said actuated member being responsive to the travel of said cartridge cover in the closing direction for effecting displacement of said transducer away from said retracted position under the influence of said biasing means until said transducer engages said cartridge disposed in said compartment to effect said coupling between said transducer support element and said other end of said stylus assembly; further closing of said cartridge cover causing additional displacement of said actuated member to a location where said actuated member is out of engagement with said transducer so that said biasing means controls said transducer/cartridge coupling independent of said retraction means.

2. Apparatus as defined in Claim 1 wherein said cover is pivotally mounted to said carriage about an axis disposed on the side of said compartment away from said transducer; said cover being provided with an actuating member adjacent to the pivoted end thereof such that said actuating member is substantially at right angles to it; said actuated member having one end secured to said actuating member such that said opening and closing of said cover respectively causes the other end of said actuated member to travel toward and away from said retracted position of said transducer; a portion of said actuated member in the vicinity of the other end of said actuated member being subject to engagement with said transducer to effect said retraction of said transducer means when said cover is opened.

3. Apparatus as defined in claim 2 wherein the point at which said actuated member is secured to said actuating member is at one location relative to said axis when said cover is opened; said point being rotated about said axis to another location when said cover is closed; said one location of said point being such that said biasing means additionally serves to keep said cover open.

* * * * *

UNITED STATES PATENT AND TRADEMARK OFFICE
CERTIFICATE OF CORRECTION

PATENT NO. : 4,333,174
DATED : June 1, 1982
INVENTOR(S) : Myron Carroll Stewart

It is certified that error appears in the above—identified patent and that said Letters Patent is hereby corrected as shown below:

Col. 1, line 52, "In the systems of the" should be the beginning of a new paragraph.

Col. 2, line 30, "poitions" should read --positions--.

Signed and Sealed this

Thirty-first Day of August 1982

[SEAL]

Attest:

Attesting Officer

GERALD J. MOSSINGHOFF
Commissioner of Patents and Trademarks